United States Patent [19]

Urry

[11] 4,154,905
[45] * May 15, 1979

[54] DISCRETE ANODE BODIES FOR USE IN VARIOUS CYLINDRICAL CELL SYSTEMS

[75] Inventor: Lewis F. Urry, Columbia Station, Ohio

[73] Assignee: Union Carbide Corporation, New York, N.Y.

[*] Notice: The portion of the term of this patent subsequent to Jun. 28, 1994, has been disclaimed.

[21] Appl. No.: 799,576

[22] Filed: May 23, 1977

Related U.S. Application Data

[62] Division of Ser. No. 659,167, Feb. 18, 1976, Pat. No. 4,039,696.

[51] Int. Cl.² ............................................. H01M 6/14
[52] U.S. Cl. ..................................... 429/94; 429/101; 429/194; 429/165; 429/128
[58] Field of Search .................. 429/94, 66, 128, 164, 429/209, 166, 133

[56] References Cited

U.S. PATENT DOCUMENTS

| 3,119,722 | 1/1964 | Tietze et al. | 429/94 X |
| 3,156,585 | 11/1964 | Yamano et al. | 429/94 |
| 3,245,837 | 4/1966 | Ikeda et al. | 429/94 X |
| 3,734,778 | 5/1973 | Huf et al. | 429/94 X |
| 3,796,606 | 3/1974 | Lehmann et al. | 429/94 |
| 4,032,696 | 6/1977 | Urry | 429/101 |

Primary Examiner—Anthony Skapars
Attorney, Agent, or Firm—Cornelius F. O'Brien

[57] ABSTRACT

The invention relates to a cylindrical type cell employing an outer cathode or cathode collector, a separator and an inner disposed anode in the form of at least two discrete bodies, said anode bodies having centrally disposed biasing means for continuously exerting an outward force against said anode bodies so as to provide good physical contact between the anode-separator-cathode or cathode collector interfaces.

6 Claims, 4 Drawing Figures

DISCRETE ANODE BODIES FOR USE IN VARIOUS CYLINDRICAL CELL SYSTEMS

This application is a division of our prior U.S. application: Ser. No. 659,167, Filing Date 2/18/76, now U.S. Pat. No. 4,039,696.

FIELD OF THE INVENTION

The invention relates to a cylindrical type cell employing an outer disposed cathode or cathode collector, a separator and an inner disposed anode, and wherein the anode is in the form of at least two discrete bodies, said bodies being axially disposed within the cell with resilient biasing means centrally located so as to continuously force the bodies radially outward to form a good physical contact against the separator which in turn contacts the cathode or cathode collector of the cell thereby maintaining a low internal resistance in the cell during discharge.

BACKGROUND OF THE INVENTION

The continuing development of portable electrically powered devices such as tape recorders and playback machines, radio transmitters and receivers, and the like, creates a continuing demand for the development of reliable, long service life cells or batteries for their operation. Recently developed electrochemical cell systems that will provide a long service life utilize highly reactive anode materials such as lithium, sodium, and the like, in conjunction with high energy density liquid cathode materials and nonaqueous electrolytes. However, the conventional cylindricall cell structures are not ideally suited for the components of these high energy cell systems. For example, in a cylindrical cell, if the anode is disposed in contact with the inner surface of the cell casing and spaced apart a fixed distance from a centrally located cathode or cathode collector by a conventional separator member, then although good contact can be provided between these components when they are assembled in the cell, the contact between these components will decrease as the anode dissolves during discharge. Consequently, the dissolving of the anode during discharge will decrease the volume of the anode and thus tend to increase the distance between anode, separator and cathode or cathode collector thereby increasing the length of the electrolyte path therebetween which will result in an increase of the internal resistance in the cell.

To overcome the above disadvantage when using the components of such high energy density cell systems, it has been proposed that the components be assembled in rolled or coiled electrode assemblies (jelly roll construction) which would ensure good contact between the components of the cell during discharge. This type of cell construction is disclosed in U.S. Pat. No. 3,809,580. Although the jelly roll construction is suitable for liquid and solid cathode cell systems, jelly roll cells are rather expensive to make and time consuming to fabricate and assemble.

U.S. Pat. No. 3,796,606 discloses a cylindrical electrochemical cell whose positive electrode is in contact with the outer casing of the cell and separated by a porous separator from a negative electrode constituted by a sheet of metal having a very negative standard oxidation potential surrounding an elastically deformable current collector having a split cylindrical shape. The elasticity of the current collector enables it to maintain biased contact with the negative electrode at all times notwithstanding alteration in electrode volumes during discharge of the cell and thus to maintain the reacting surfaces of the solid positive and negative electrodes at optimum distances by continuously biasing the negative electrode against the porous separator.

It is an object of this invention to provide a cylindrical type cell employing an inner disposed active metal anode in the form of at least two discrete bodies, such as arcuate or rectangular bodies.

It is another object of the present invention to provide a cylindrical type electrochemical cell employing a liquid or solid active cathode material in conjunction with an active metal anode in the form of at least two discrete arcuate or rectangular bodies.

It is another object of the present invention to provide a nonaqueous cylindrical cell employing a carbonaceous cathode collector, a separator and an inner disposed anode in the form of at least two discrete bodies having resilient biasing means disposed between or within said anode bodies so as to continuously bias the bodies radially outward thereby maintaining the anode, separator and cathode collector of the cell in physical and ionic contact.

It is another object of the present invention to provide cylindrical type cell employing a cathode or cathode collector in conjunction with an inner disposed anode in the form of at least two discrete arcuate bodies having resilient biasing means axially within the space defined by said anode arcuate bodies so that when said arcuate bodies and resilient biasing means are disposed axially within the cylindrical cell, the resilient biasing means will exert a radially outward continuous force so as to maintain the anode, separator and cathode or cathode collector of the cell in physical and ionic contact.

It is another object of the present invention to provide a cylindrical cell employing two semi-cylindrical cathode or cathode collector members in conjunction with at least two discrete rectangular anodes disposed between the semi-cylindrical members and separated from said semi-cylindrical members by a separator and wherein resilient biasing means are employed between the anode members so as to continuously bias said anode members against said separator which in turn contacts the cathode or cathode collector members thereby maintaining these components in physical and ionic contact.

It is another object of the present invention to provide a nonaqueous cylindrical cell having component parts easy to assemble and which will exhibit a relatively low internal cell resistance during discharge.

The foregoing and additional objects will become more fully apparent from the description hereinafter and the accompanying drawings.

SUMMARY OF THE INVENTION

The invention relates to an electrochemical cell comprising a container; a cathode or cathode collector disposed within said container; a porous separator disposed within and in surface contact with said cathode or cathode collector; an anode in the form of at least two discrete bodies disposed within said separator; means for continuously biasing said anode bodies radially outward against said separator which in turn contacts the cathode or cathode collector; and an electrolyte with or without a liquid active reducible cathode disposed within said container. More specifically, an electrochemical cell in accordance with this invention could comprise an electrically conductive container closed at one end and open at the other end; a cathode or cathode collector disposed within and in surface contact with said container so as to adapt said container as the first terminal of the cell; a separator disposed within and in surface contact with said cathode or cathode collector; an anode in the form of at least two discrete bodies disposed within said separator; means for resiliently biasing said anode bodies outward in surface contact with said separator which in turn contacts said cathode or cathode collector thereby effectively maintaining physical and ionic contact between the anode, separator and cathode or cathode collector interfaces during discharge of the cell; an electrolyte disposed within and in contact with said cathode or cathode collector and anode; a cover for said container; an insulating member interposed between said cover and the top inner wall of said container such that a seal is formed between said cover and said container; and said anode and said cover being electrically interconnected so as to adapt said cover as the second terminal of the cell.

If desired, the cell's container could be made from a plastic tube with metal bottom and top closures and an inner metal liner, said metal liner being employed to provide contact with the cathode or cathode collector shell and the bottom metal closure.

A separator (electronically insulating material) could be disposed between the inner wall of the container or the metal liner within the container and the cathode or cathode collector whereupon the cathode or cathode collector could then be electronically connected to the cover of the cell thereby adapting it as the positive terminal of the cell while the centrally disposed anode could be electronically connected to the container or the metal liner within the container thereby adapting it as the negative terminal of the cell.

As used herein and as desired in an article titled "Electrochemical Reactions in Batteries" by Akiya Kozawa and R. A. Powers in the Journal of Chemical Education—Vol. 49, pages 587 to 591, Sep. 1972 issue, a cathode, (positive electrode) is a reactant material that is electrochemically reduced on discharge of the cell. A cathode collector is not an active reducible or oxidizable material and functions as a current collector (electronic conductor) to the cathode for a cell.

As used herein, an arcuate body shall mean an arc segment of a generally cylindrical shape, preferably ranging from about a 90° arc segment to below about a 180° arc segment depending on the number of arc segments employed in the cell. For example, when two arc segments are used, then each could range from about a 140° arc segment to below about a 180° arc segment while when employing three arc segments, then each could range from about a 90° arc segment to below about a 120° arc segment. As used herein a generally cylindrical spring member shall mean a coiled spring having one or more turns or an arcuate spring segment of less than 360°.

In a cell employing a liquid active cathode and a cathode collector, the cathode collector in addition to functioning as the current collector must also serve as extended area reaction sites for the cathodic electrochemical process of the cell. Thus the cathode collector should have porosity with preferably at least 50% interconnected voids for providing increased access to reaction sites, and be of a material capable of catalyzing or sustaining the cathodic electrochemical process. Materials suitable for use as a cathode collector are carbon materials and metals, such as nickel, with acetylene black being preferable. In addition to the above characteristics, the cathode collector when made of a particulate material should be capable of being molded directly within a can or capable of being molded into various size discrete bodies that can be handled without cracking or breaking. To impart a cohesive characteristic to some types of cathode collectors, such as carbonaceous cathode collectors, a suitable binder material, with or without plasticizers and with or without stabilizers, can be added to the cathode collector materials. Suitable binder materials for this purpose may include vinyl, polyethylene, polypropylene, acrylics, styrene and the like. For example, polytetrafluoroethylene would be the preferred binder for cathode collectors for use with liquid oxyhalide cathodes. The binder, if required, should be added in an amount between about 10% and about 30% by weight of the molded cathode collector since an amount less than 10% would not provide sufficient strength to the molded body while an amount larger than 30% would wetproof the surface of the carbon and/or reduce the available surface of the carbon, thereby reducing the activation site areas required for the cathodic electrochemical process of the cell. Preferably, the binder should be between 10% and 25% by weight of the cathode collector. Of importance in selecting the materials for the cathode collector is to select materials that will be chemically stable in the cell system in which they are to be used.

In another embodiment of this invention in which a solid active cathode is employed, then the solid cathode should be sufficiently porous for penetration by the electrolyte of the cell. As stated above with reference to the cathode collector, the solid cathode should be capable of being molded directly inside a can or be capable of being molded into various size discrete bodies that can be handled without cracking or breaking. To impart a cohesive characteristic to some type of cathode materials, a suitable binder material, with or without plasticizers and with or without stabilizers, may be added to the cathode materials. Suitable binder materials for this purpose may include Portland cement, or resins such as vinyl, polyethylene, polypropylene, acrylics, styrene and the like, with polytetrafluoroethylene being the preferred. In some cell systems, the active cathode material can be mixed with carbon and/or graphite material along with the binder. For example, molded manganese dioxide electrodes are generally composed of particulate manganese dioxide mixed with a particulate conductive material such as carbon and/or graphite and a suitable binder as recited above. The binder when used in molded cathodes for use in this invention can vary between about 3% and about 20% by weight of the molded cathode, preferably the binder could be added in an amount between about 4% and 7% by weight of the cathode.

The anode materials for use in this invention can be any of the anodic materials known in the art and which can be fabricated into discrete bodies, such as elongated arcuate bodies or elongated rectangular bodies.

A conductive spring member made of a material such as nickel, stainless steel, or Inconel (a trademark for a corrosion-resisting alloy containing 76% Ni, 15% Cr and 9% Fe) could be employed as the electrically conductive means for electrically connecting the anode to the negative terminal of the cell while also functioning as the resilient biasing means for mechanically forcing the anode bodies radially outward against the separator in the cell. This could be accomplished, for example, by using a conductive "U" shaped or coiled spring member which can be squeezed and inserted between or into a space defined by the anode bodies of this invention whereupon the expansion of the spring member will provide continuous electrical pressure contact to the anode bodies while also resiliently biasing said bodies against the separator which in turn contacts the cathode or cathode collector of the cell which itself is in contact with the inner surface of the cell's container. An extended end or leg of the "U" shaped spring member, if conductive, could be secured in a conventional manner to the cover or container of the cell thereby adapting the cover or container as the negative terminal of the cell. In another embodiment, a separate conductive strip, such as nickel strip, could be secured at one end to the "U" shaped or coiled spring member and the other end of the strip could be secured to the cover or container of the cell so as to adapt the cover or container as the negative terminal of the cell.

The biasing means suitable for use in this invention could be any spring means which will exert a resilient bias against the anode bodies when assembled in a cell so as to provide continuous physical contact between said bodies and the separator, between the separator and the cathode or cathode collector, and between the cathode or cathode collector and the container of the cell thereby resulting in a low internal cell resistance during discharge.

The cell made in accordance with this invention will have the advantage that as the inner anodic electrode is being consumed during discharge, the resilient biasing means will exert a force against this electrode thereby maintaining good interface contact between the anodic electrode and the separator while the separator in turn in being maintained in a fixed position in contact with the cathode or cathode collector of the cell.

Liquid active reducible cathode materials usually are mixed with a conductive solute which is a non-reactive material and which is added to improve conductivity of the liquid active reducible cathode materials, or the liquid cathode materials can be mixed with both a conductive solute and an electrochemically reactive or non-reactive cosolvent material. When an electrolyte solvent performs the dual function of acting as solvent for an electrolyte salt and as the active cathode material of the cell, then the solution is referred to as a "cathode-electrolyte". In assembling the cell, a liquid cathode could be placed into the anode cavity where it would permeate through the anode bodies and then through the separator to contact the cathode collector of the cell. Alternatively or in addition, the separator could be soaked with the liquid cathode prior to being assembled in the cell or after it is assembled in the cell. Thus the cavity defined by the bodies of the anode could be used as a reservoir for the cathode-electrolyte. In one embodiment of this invention, the cathode collector is in the form of semi-cylindrical members having a longitudinal groove imparted in their outer surfaces that face the internal wall of the container so as to provide reservoirs for the electrolyte or cathode-electrolyte of the cell.

Suitable nonaqueous liquid cathode materials for use in this invention could be one or more of the liquid oxyhalides of an element of Group V or Group VI of the Periodic Table and/or one or more of the halides of an element of Group IV to Group VI of the Periodic Table, said Periodic Table being the Periodic Table of Elements as set forth on the inside back cover of the Handbook of Chemistry and Physics, 48th Edition, The Chemical Rubber Co., Cleveland, Ohio, 1967-1968. For example, such nonaqueous cathode materials would include sulfuryl chloride, thionyl chloride, phosphorus oxychloride, thionyl bromide, chromyl chloride, vanadyl tribromide, selenium oxychloride, sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride. Another suitable cathode material would be liquid sulfur dioxide. Examples of suitable anodes for use in nonaqueous cells would include lithium, sodium, calcium, magnesium, lithium monoaluminide and lithium-magnesium alloy.

It has been found that in nonaqueous cell systems using oxyhalide cathodic solutions, the cathode collector should be about 75% to 85% porous and have a maximum thickness of about 0.150 inch (0.381 cm) for most conditions of cell discharge. The conventional large size cylindrical cell usually employs an axially disposed cylindrical cathode collector having a thickness greater than the 0.150 inch (0.381 cm) requirement, thus resulting in some of the active sites in the cathode collector not being utilized. Using the concept of this invention, the cathode collector is in the form of a cylindrical tube and is disposed radially outward of the anodic electrode so that its width can be fabricated within the above thickness limit. In addition, the thinner the cathode collector for a given outside diameter of a cylindrical cell, the greater the diameter of the anode and the lower the electrode current density on discharge. This lower electrode current density results in greater efficiency of anode utilization and less tendency of the anode to passivate. Thus the present invention wherein the outermost active member of the cylindrical cell is the cathode collector, then considering the cross section of the cell, the cathode collector can be fabricated with the thinnest cross section for a given volume of material. The same amount of cathode collector material in an axially disposed cathode collector cell embodiment would result in a cathode collector having a significant thicker wall dimension than the cathode collectors usable with this invention. Additional advantages of the cathode collector of the present invention is that the cathode collector is easier to manufacture since the somewhat fragile cathode collector will be supported by the container's wall thereby requiring less binder and thus providing more reaction sites, i.e., sites not masked by the binder.

Suitable aqueous cathode materials for use in this invention include aqueous solutions of persulfate, peroxide, permanganate and chromic acid. Examples of suitable anodes for aqueous cells would include aluminum, magnesium, zinc and cadmium.

Some preferred combinations of nonaqueous cathode materials and anodes would be as follows:
  (1) sulfuryl chloride/Li or Na;
  (2) thionyl chloride/Li or Na;
  (3) phosphorus oxychloride/Li or Na;
  (4) sulfur monochloride/Li or Na;
  (5) sulfur monobromide/Li or Na;
  (6) selenium tetrafluoride/Li or Na.

Some preferred combinations of soluble aqueous cathode materials and anodes would be a zinc, magnesium or aluminum anode in an aqueous solution of persulfate or chromic acid.

In addition to the manganese dioxide solid cathode electrodes for use in Leclanche electrochemical systems, a wide variety of other solid cathode electrodes for other electrochemical systems can be used in this invention. Among the solid cathode electrode materials that are suitable for use in this invention are such materials as lead dioxide, nickel oxyhydroxide, mercuric oxide, silver oxide, inorganic metal halides such as silver chloride and lead chloride, and organic materials which are capable of being reduced such as dinitrobenzene and azodicarbonamide compounds. Among the negative electrode materials that are suitable for use in this invention are zinc, zinc-clad steel, aluminum, magnesium, lead, cadmium and iron. Suitable electrolytes are ammonium chloride and/or zinc chloride, zinc perchlorate, zinc bromide, various alkaline electrolytes such as the hydroxides of potassium, sodium and/or lithium, acidic electrolytes such as sulfuric or phosphoric acid, and nonaqueous electrolytes, said electrolytes being chosen to be compatible with the negative and positive electrodes.

The solute for use in this invention may be a simple or double salt which will produce an ionically conductive solution when dissolved in a suitable solvent. Preferred solutes for nonaqueous systems are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226, July/Dec., 1938, pages 293–313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride, and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride, and potassium bromide.

It will be obvious to those skilled in the art that the double salts formed by a Lewis acid and an ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

If desired, a cosolvent may be added to the liquid active reducible cathode and solute solution to alter the dielectric constant, viscosity or solvent properties of the solution to achieve better conductivity. Some examples of suitable cosolvents are nitrobenzene, tetrahydrofuran, 1,3-dioxolane, 3-methyl-2-oxazolidone, propylene carbonate, γ-butyrolactone, sulfolane, ethylene glycol sulfite, dimethyl sulfite, dimethyl sulfoxide, benzoyl chloride, dimethoxyethane, dimethyl isoxazole, diethyl carbonate, and the like.

The separator for use in this invention can be made from a wide variety of materials, such as glass, plastics, cellulose, starch, etc. It can be in the form of swellable coatings on paper, swellable films such as cellulose in aqueous solutions, woven or felted papers, perforated sheets or combinations of the foregoing.

The separator has to be chemically inert and insoluble in the cell system and should have a porosity of about 25 per cent or more, preferably about 50 per cent, so as to permit the liquid electrolyte to permeate through and contact the anode, thus establishing an ion transfer path between the anode and cathode. Suitable separators for use with liquid oxyhalide cathodes are the non-woven glass separators, preferably those separators that incorporate long glass fibers along with the short glass fibers since such a combination increases the tear strength of the separators thereby making them easier to handle.

Suitable separators for use with aqueous systems for example are starch or methyl cellulose on felted paper, cast cellulose film, gelled wheat starch or flour pastes, felted or woven fibers of plastic such as nylon, polyethylene, etc. or porous cast vinyl sheets.

The container and cover for use in this invention can be stainless steel, iron, nickel, nickel-plated steel, plastic or some other material that will not corrode or otherwise deteriorate when in contact with the cell materials. Preferably in the case of the liquid oxyhalide cathode system, the container and cover could be made of 304 stainless steel which has been heat treated to release the inherent stresses introduced during conventional drawing operations or of nickel.

The insulating member disposed between the cover and the can has to be stable in the presence of the cell components and can be selected from such materials as polytetrafluoroethylene (e.g., "Teflon"), fluorinated ethylene-propylene (e.g., FEP), ethylene copolymer with FEP (e.g., "Tefzel"), chlorotrifluoroethylene (e.g., "Kel-F"), perfluoro-alkoxy polymer (e.g., PFA), tetrafluoroethylene (TFE), polyvinyl, polyethylene, polystyrene etc.

The present invention will become apparant from the following description thereof when considered together with the accompanying drawings which are set forth as being exemplary of embodiments of the present invention and are not intended, in any way, to be limitative thereof and wherein.

Figure 1:
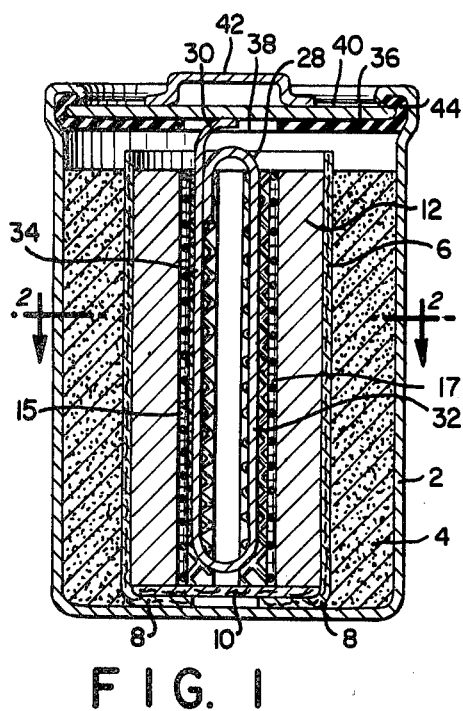
FIG. 1 is a vertical cross-sectional view of a fully assembled electrochemical cell made in accordance with this invention.

Referring in detail to FIG. 1, there is shown a cross-sectional view of a cylindrical cell comprising a cylindrical container 2 having disposed therein a cathode or cathode collector shell 4 in contact with the inner upstanding circumference of the container 2 thereby adapting the container as the cathodic or positive terminal for the cell. Disposed within and in contact with the inner circumference of cathode or cathode collector 4 is a separator liner 6 with its bottom end 8 radially folded inward and supporting a bottom separator or disc 10. If desired, the cathode or cathode collector material could be extruded within the container 2, rolled with the can material or composed of one or more segments to form a cylindrical tube and then placed in the can.

Figure 2:
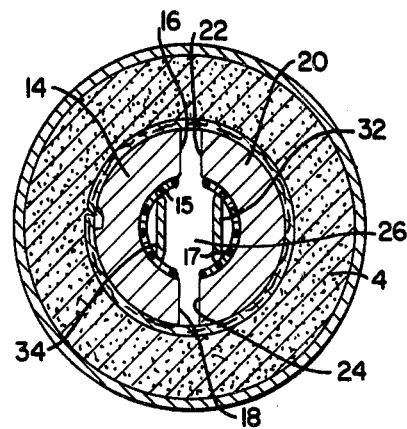
FIG. 2 is a sectional view taken along line 2—2 of FIG. 1.

A two member anode 12 is shown in FIGS. 1 and 2 comprising a first half cylindrical annular member 14 having flat end faces 16 and 18 and a second half cylindrical annular member 20 having flat end faces 22 and 24. When the flat end faces of each cylindrical half member are arranged in an opposing fashion as shown in FIGS. 1 and 2, an axial opening 26 is defined between the cylindrical half annular members 14 and 20.

If desired, arcuate type backing sheets 15 and 17, such as inert electrically conductive metals screens or grids, could be disposed against the inner surface wall of the anode bodies 14 and 20 respectively, to provide uniform current distribution over the anode. This will result in a substantial uniform consumption or utilization of the anode while also providing a substantial uniform spring pressure over the inner wall surface of anode as will be discussed below.

An electrically conductive spring strip 28 is appropriately bent into a flattened elliptically shaped member having an extending end 30. When inserting the spring strip 28 into a container the legs 32, 34 of the conductive strip 28 are squeezed together and forced into the axial opening between the two screen backed anode members arranged in a container as shown in FIGS. 1 and 2. The inserted conductive spring strip 28 resiliently biases the two anode members 14 and 20 via backing screens 15 and 17 so as to provide a substantially uniform and continuous pressure contact over the inner wall of the anode members. The extended end 30 of spring strip 28 is shown projected above the surface of anode members 14 and 20. An insulator disc 36 has a central opening 38 through which the projected end 30 of the spring strip 28 passes, whereupon the end 30 is then welded to a two part cover 40 and 42 thereby adapting the two-piece cover 40-42 as anodic or negative terminal of the cell. Before closing the cell, the electrolyte or cathode-electrolyte can be dispensed in opening 26 whereupon it can permeate through the anode, separator and cathode or cathode collector of the cell. In addition, the separator could be presoaked with the electrolyte or cathode-electrolyte prior to being inserted into the cell.

The insulating disc 36 has a peripheral depending skirt 44 disposed between cover 40 and the upper inner wall of container 2 for sealing the cell through conventional crimping techniques.

Figure 3:
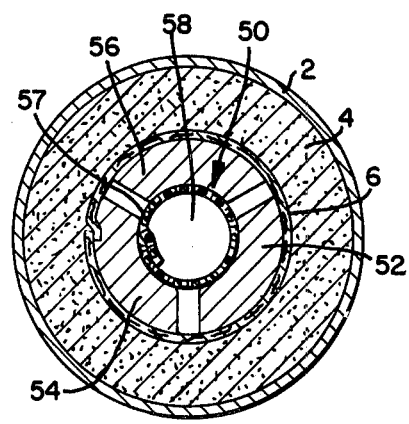
FIG. 3 is a horizontal cross-sectional view of another embodiment of a cell made in accordance with this invention.

Another embodiment of an anode is shown in FIG. 3 along with several identical components and identified with the same reference numbers as shown in FIGS. 1 and 2. Specifically, a three-member anode 50 is shown which comprises a first arcuate member 52, a second arcuate member 54 and a third arcuate member 56, each of which has an arc measurement of about 120°. When the longitudinal flat end faces of the arcuate bodies 52, 54 and 56 are arranged in an opposing fashion as shown in FIG. 3, an axial opening 58 is defined between said members. Thus when this three-member anode is inserted into a container with a coiled spring member 57 inserted into the axial opening 58 defined by said anode members, the coiled spring member 57 will resiliently bias the anode arcuate members against the separator 6 of the cell which in turn contacts the cathode or cathode collector 4 of the cell 2 thereby maintaining good physical contact between these components.

Figure 4:
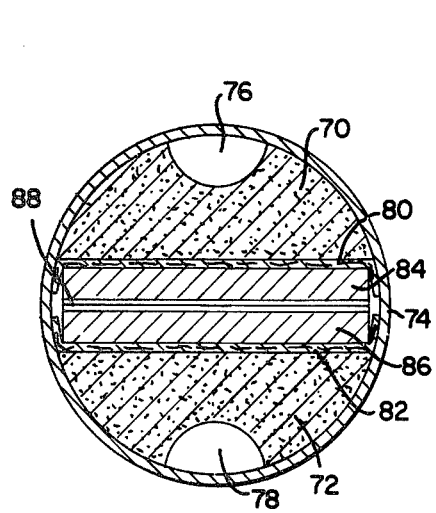
FIG. 4 is a horizontal cross-sectional view of still another embodiment of a cell made in accordance with this invention.

Another embodiment of a two-member anode according to this invention is shown in FIG. 4. Specifically, semi-cylindrical cathode or cathode collector members 70, 72 are shown disposed within a cylindrical container 74 and having longitudinal semi-circular grooves 76 and 78, respectively, imparted in their curved outer surfaces that face the internal wall of the can 74. Disposed adjacent and in contact with each of the longitudinal flat surfaces of members 70 and 72 are separators 80 and 82, respectively. Disposed within the opening defined by the separators 80 and 82 is an anode composed of two elongated rectangular members 84 and 86 which are forced apart by a folded compressed spring member 88 disposed between said anode members 84 and 86. This spring member 88 biases the anode members 84 and 86 against the separator 80 and 82, respectively, which in turn is held against cathodes or cathode collectors 70 and 72, respectively, thereby maintaining good contact between these components. Opening 76 and 78 can act as reservoirs for the electrolyte or cathode-electrolyte of the cell. This type of cell embodiment has an advantage where the cell reaction products are solid and tend to precipitate out since the diffusion of the dissolved salts or liquid cathode to the reaction sites in the positive electrode is not impeded by the formation of solid blocking reaction products between the anode and the reaction sites. In addition, the anode members for this type cell as shown in FIG. 4 are easier to fabricate and assemble in a cell than the anode member shown in FIG. 3.

EXAMPLE

Two "C" size cells were constructed similar to the cell construction shown in FIGS. 1 and 2 except that the cathode collector was formed of two half cylindrical annular members and an anode backing sheet was not used.

The cathode collector half-cylindrical annular members were made using acetylene black and Teflon (trademark for polytetrafluoroethylene) in the proportions shown in Table 1.

Table 1

| Acetylene Black | 10.0 g | 90% |
|---|---|---|
| *"Teflon" Emulsion T-30B | 1.85 g | 10% (Teflon) |
| **"Tergitol" 15S9 | .45 g | — |
| Water | 700 ml | |

*Obtained commercially from DuPont which containsbasically polytetrafluoroethylene.
**Obtained commercially from Union Carbide whichcontains mainly nonionic polyglycol ether.

The acetylene black was slowly added to a well stirred solution of water, Tergitol and Teflon emulsion until the acetylene black was thoroughly wetted and dispersed. The water in the slurry so formed was then substantially removed. The cake thus formed was then sintered in a controlled atmosphere at 370° C. for 30 minutes. The sintered cake was then broken up into fine particles of powder and molded into half cylindrical annular members. Two of the annular members were inserted in a 304 stainless steel container and then heated for 30 minutes at 370° F. This heating operation expanded the members so that they became locked firmly in the container. A tubular nonwoven glass separator was then inserted in the container followed by the insertion of two half cylindrical lithium anode members as generally shown in FIGS. 1 and 2. A spring member as shown in FIGS. 1 and 2 was compressed and inserted into the axial opening defined by the anode members. Upon release of the compressive force on the spring member, the anode was mechanically biased radially outward thereby imparting a good physical contact to the separator which in turn physically contacted the cathode collector of the cell. An extended leg of the spring member was projected through an opening in an insulating disc and a Teflon gasket and then welded to a stainless steel cover. Before sealing the cover to the container, a 1.0 molar solution of $LiAlCl_4$ in $SO_2Cl_2$ was fed into the container. The cell was then sealed in a conventional manner.

Two such cells were discharged across a 88-ohm load and the data obtained are shown in Tables II and III.

Table II

| Cell Sample | Impedance of fresh cell | Impedance after test | Hours to 2.5 volt cutoff | Ampere hours to 2.5 volt cutoff |
|---|---|---|---|---|
| 1 | 1.83 ohms | 1.58 ohms | 205 hours | 8.18 ampere hours |
| 2 | 1.79 ohms | 1.31 ohms | 209 hours | 8.41 ampere hours |

Table III

| Cell Sample | Watt hours per cubic inch to 2.5 volt | Average voltage to 2.5 volts | *Li utilization to 2.5 volts |
|---|---|---|---|
| 1 | 19.3 | 3.51 | 81.3% |
| 2 | 19.9 | 3.54 | 83.9% |

*Li Utilization = $\frac{\text{Amp. Hours out} \times 100\%}{\text{total lithium in cell at start}}$ As evidenced by the test data, the cells yielded high energy densities and high lithium utilization thereby demonstratively showing the benefits of the subject invention.

What is claimed is:

1. An electrochemical cell comprising a container; a solid active reducible cathode disposed within said container; a porous separator disposed within and in surface contact with said cathode; an anode in the form of at least two rectangular bodies disposed within said separator; means for biasing said anode bodies against said separator which, in turn, contacts the cathode; and an electrolyte solution disposed within said container.

2. The cell of claim 1 wherein the means for biasing the bodies of the anode is a substantially U-shaped spring member in physical contact with and disposed between said anode bodies.

3. The cell of claim 1 wherein the means for biasing the anode bodies is conductive and is adapted for securing to a negative terminal of the cell.

4. The cell of claim 1 wherein the cathode comprises two substantially semi-cylindrical cathodes each having a groove imparted in its curved outer surface that faces the internal wall of the container so as to provide an opening for the electrolyte of the cell.

5. The cell of claim 4 wherein the means for biasing the bodies of the anode is a substantially U-shaped spring member in physical contact with and disposed between said anode bodies.

6. The cell of claim 4 wherein the means for biasing the anode bodies is conductive and is adapted for securing to a negative terminal of the cell.

* * * * *